(12) United States Patent
Eliasson et al.

(10) Patent No.: US 7,995,039 B2
(45) Date of Patent: Aug. 9, 2011

(54) TOUCH PAD SYSTEM

(75) Inventors: Jonas Ove Philip Eliasson, Valby (DK); Jens Wagenblast Stubbe Østergaard, Roskilde (DK)

(73) Assignee: FlatFrog Laboratories AB, Lund (SE)

( * ) Notice: Subject to any disclaimer, the term of this patent is extended or adjusted under 35 U.S.C. 154(b) by 521 days.

(21) Appl. No.: 11/994,730

(22) PCT Filed: Jun. 30, 2006

(86) PCT No.: PCT/DK2006/000390
§ 371 (c)(1),
(2), (4) Date: Dec. 5, 2008

(87) PCT Pub. No.: WO2007/003196
PCT Pub. Date: Jan. 11, 2007

(65) Prior Publication Data
US 2009/0122020 A1    May 14, 2009

Related U.S. Application Data

(60) Provisional application No. 60/695,885, filed on Jul. 5, 2005.

(51) Int. Cl.
*G06F 3/041* (2006.01)
(52) U.S. Cl. .............. 345/173; 345/175; 178/18.09
(58) Field of Classification Search .......... 345/173–176; 178/18.01–18.09
See application file for complete search history.

(56) References Cited

U.S. PATENT DOCUMENTS

| | | | |
|---|---|---|---|
| 4,180,702 A | 12/1979 | Sick et al. | |
| 4,346,376 A | 8/1982 | Mallos | |
| 4,484,179 A * | 11/1984 | Kasday | 345/176 |
| 4,542,375 A | 9/1985 | Alles et al. | 340/712 |
| 5,600,105 A | 2/1997 | Fukuzaki et al. | 178/19 |
| 5,672,852 A | 9/1997 | Fukuzaki et al. | 178/19 |
| 5,686,942 A | 11/1997 | Ball | 345/158 |
| 5,729,249 A | 3/1998 | Yasutake | 345/173 |
| 5,945,980 A | 8/1999 | Moissev et al. | 345/173 |
| 6,061,177 A | 5/2000 | Fujimoto | 359/443 |
| 6,227,667 B1 | 5/2001 | Halldorsson et al. | 351/206 |
| 6,380,732 B1 | 4/2002 | Gilboa | 324/207.17 |

(Continued)

FOREIGN PATENT DOCUMENTS

DE    10139147 A1    3/2003

(Continued)

OTHER PUBLICATIONS

Iizuka, Keigo, *Elements of Photonics, vol. I: In Free Space and Special Media*, Jun. 15, 2002, John Wiley & Sons, Inc., Chapter 2, pp. 110-165.

*Primary Examiner* — Amare Mengistu
*Assistant Examiner* — Premal Patel
(74) *Attorney, Agent, or Firm* — Pillsbury Winthrop Shaw Pittman LLP

(57) ABSTRACT

Radiation guided by Total Internal Reflection inside a solid element from a point of engagement of a reflecting/emitting/scattering object and toward a detector reaches an area of the solid element on which the surface has areas preventing reflection of the radiation back into the element. This provides a spatial modulation of the radiation reaching the detector through one of the surfaces of the solid element. From this spatial modulation, the position of engagement may be determined.

11 Claims, 3 Drawing Sheets

U.S. PATENT DOCUMENTS

Figure 1:
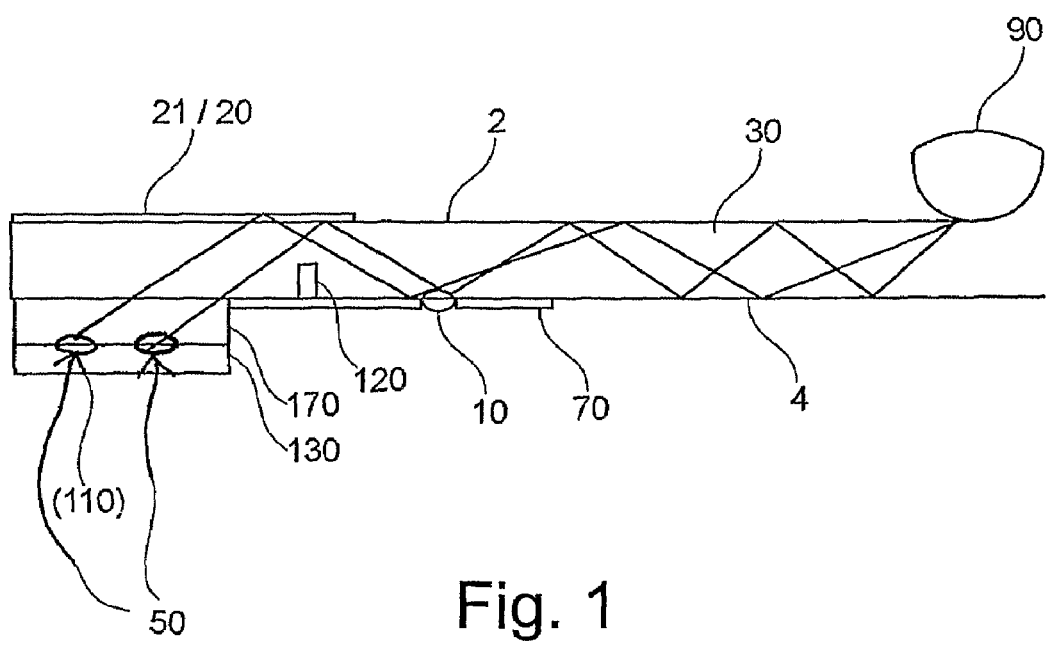

| | | | | |
|---|---|---|---|---|
| 6,390,370 | B1 | 5/2002 | Plesko | 235/462.49 |
| 6,660,964 | B1 | 12/2003 | Benderly | 219/121.74 |
| 6,799,141 | B1 | 9/2004 | Stoustrup et al. | 702/159 |
| 7,133,031 | B2 | 11/2006 | Wang et al. | 345/173 |
| 7,442,914 | B2 | 10/2008 | Eliasson et al. | 250/221 |
| 7,465,914 | B2 | 12/2008 | Eliasson et al. | 250/221 |
| 7,847,789 | B2 | 12/2010 | Kolmykov-Zotov et al. | 345/173 |
| 2002/0158823 | A1 | 10/2002 | Zavracky et al. | 345/87 |
| 2002/0158853 | A1 | 10/2002 | Sugawara et al. | 345/176 |
| 2003/0137494 | A1 | 7/2003 | Tulbert | 345/173 |
| 2003/0156100 | A1 | 8/2003 | Gettemy | 345/204 |
| 2003/0214486 | A1 | 11/2003 | Roberts | 345/173 |
| 2004/0027339 | A1 | 2/2004 | Schulz | 345/173 |
| 2004/0032401 | A1 | 2/2004 | Nakazawa et al. | 345/173 |
| 2004/0238627 | A1 | 12/2004 | Silverbrook et al. | 235/382 |
| 2004/0239702 | A1 | 12/2004 | Kang et al. | 345/863 |
| 2004/0252091 | A1 | 12/2004 | Ma et al. | 345/87 |
| 2004/0252867 | A1 | 12/2004 | Lan et al. | 382/124 |
| 2005/0156914 | A1 | 7/2005 | Lipman et al. | 345/179 |
| 2005/0212774 | A1 | 9/2005 | Ho et al. | 345/173 |
| 2005/0248540 | A1 | 11/2005 | Newton | 345/173 |
| 2005/0253834 | A1 | 11/2005 | Sakamaki et al. | 345/207 |
| 2006/0001653 | A1 | 1/2006 | Smits | 345/176 |
| 2006/0017706 | A1 | 1/2006 | Cutherell et al. | 345/173 |
| 2006/0033725 | A1 | 2/2006 | Marggraff et al. | 345/179 |
| 2006/0256092 | A1 | 11/2006 | Lee | 345/173 |
| 2006/0279558 | A1 | 12/2006 | Van Delden et al. | 345/176 |
| 2006/0281543 | A1 | 12/2006 | Sutton et al. | 463/29 |
| 2006/0290684 | A1 | 12/2006 | Giraldo et al. | 345/175 |
| 2007/0052684 | A1 | 3/2007 | Gruhlke et al. | 345/173 |
| 2007/0125937 | A1 | 6/2007 | Eliasson et al. | 250/221 |
| 2007/0152985 | A1 | 7/2007 | Ostergaard et al. | 345/176 |
| 2009/0135162 | A1 | 5/2009 | Van De Wijdeven et al. | 345/175 |

FOREIGN PATENT DOCUMENTS

| | | |
|---|---|---|
| EP | 1 457 870 | 9/2004 |
| GB | 2 409 515 | 6/2005 |
| WO | WO 84/03186 | 8/1984 |
| WO | WO 2004/081502 A2 | 9/2004 |
| WO | WO 2004/081956 A2 | 9/2004 |
| WO | WO 2005/026938 | 3/2005 |
| WO | WO 2005/029172 | 3/2005 |
| WO | WO 2005/029395 | 3/2005 |
| WO | WO 2005/125011 | 12/2005 |
| WO | WO 2006/124551 | 11/2006 |

* cited by examiner

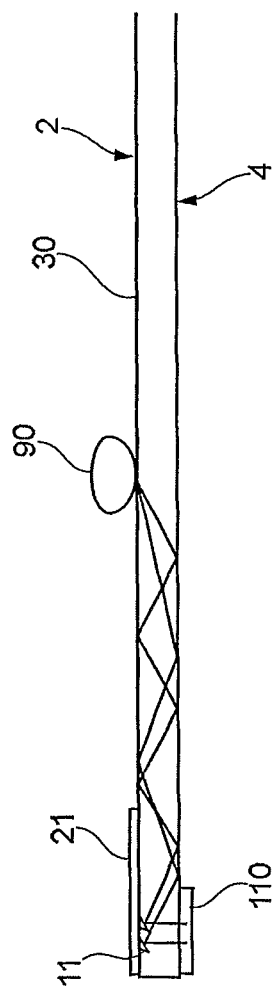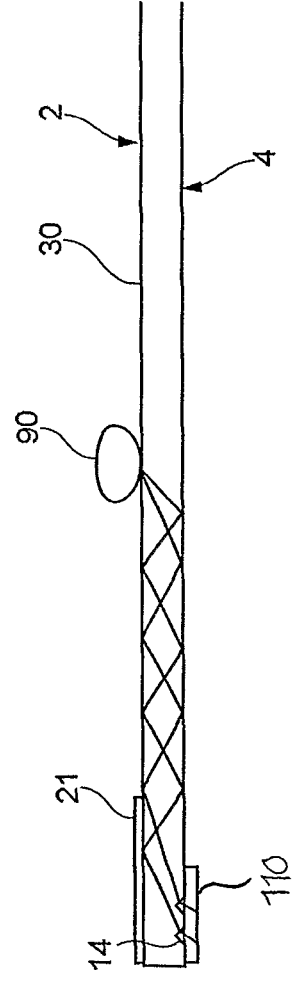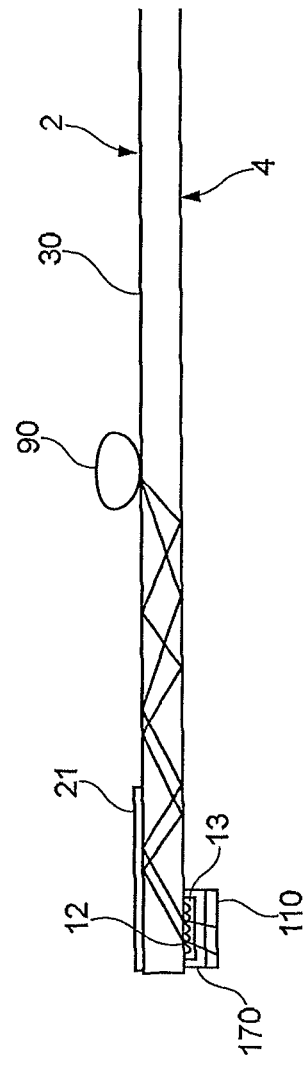

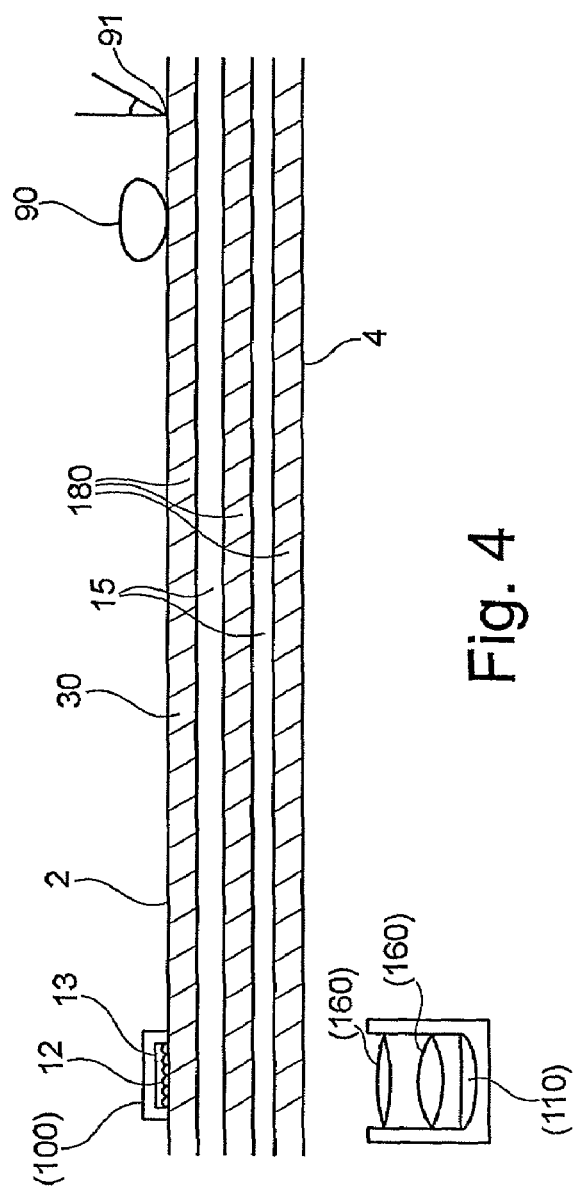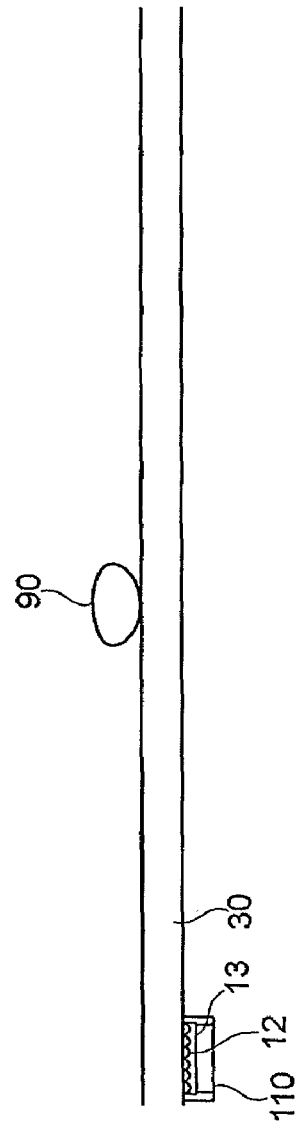

TOUCH PAD SYSTEM

CROSS REFERENCE TO RELATED APPLICATIONS

This is the U.S. National Phase of PCT/DK2006/000390, filed Jun. 30, 2006, which claims priority of U.S. patent application Ser. No. 60/695,885, filed Jul. 5, 2005. The content of each are incorporated by reference herein in their entirety.

The present invention relates to a system for determining a position of an object adapted to reflect/scatter/emit radiation. In particular the present invention relates to a system wherein a modulation means is provided on an upper and/or lower surface of a transmissive element.

Touch pads in general are described in e.g. U.S. Pat. Nos. 4,346,376, 4,484,179, 4,688,933, 5,945,981, 6,538,644, 5,679,930, 4,710,760, 4,484,179, 5,484,966, 6,172,667, 5,065,185, and 6,122,394, US 2003/0048257 and 2003/0052257, as well as JP 63143862, 08075659, and 08149515.

The present invention relates to a system for determining a position of an object adapted to reflect/scatter/emit radiation, the system comprising:
- a radiation transmissive element having a first surface being adapted to be engaged by the object so as to reflect/scatter/emit radiation into the element and a second surface opposite to the first surface, the radiation transmissive element being adapted to guide reflected/scattered/emitted radiation therein by total internal reflection along a first part of a radiation path extending from the object toward a detecting means;
- the detecting means having an at least one-dimensional detecting surface and being adapted to detect radiation through the first and/or the second surface, which radiation is reflected/scattered/emitted by the object, and to output a signal relating to the detected radiation; and
- a modulating means being provided in the first part of the radiation path, the modulating means being adapted to prevent at least a part of the reflected/scattered/emitted radiation from propagating to the detecting means, the modulation means being positioned on or at the first and/or the second surface and defining, in the plane of the first and/or second surface, a plurality of areas,
  - one or more first of the areas allowing or facilitating reflection of radiation travelling in the element back into the element, and
  - one or more second of the areas preventing reflection of radiation travelling in the element back into the element.

Thus, according to the invention, radiation emitted/scattered/reflected will firstly be modulated by the modulating means before being detected. The detected radiation will depend on the relative positions of the detecting means, the point of engagement of the object, and the modulating means (that is, the first and second areas thereof).

Normally, in the plane of the first and/or second surfaces, the radiation path will be linear from the point of engagement of the object, the modulating means and the detection means, but the modulating means may comprise optical elements (such as mirrors) adapted to redirect radiation toward the detecting means, which may then be positioned at other positions than a straight line through the modulating means and the point of engagement.

One advantage of the present invention is that it is easier to manufacture planar first and second surfaces than to manufacture planar edge surfaces. Accordingly, the requirements to the transmissive element may be lower than in solutions wherein the detecting means are attached to the edge of the transmissive element.

A further advantage is that it is easier to attach the detecting means to the first and/or second surface than to the thin edge portion of the transmissive element. Thus, the present invention provides easy integration with modern flat panel screen technology wherein the trend is towards thinner screens.

Furthermore, as the detecting means are not attached to the edge but rather to the surface of a transmissive element, the system may be provided at any zone/area of a radiation transmissive element and is not limited to the edge of a transmissive element. Accordingly, the system may be provided in the centre of a shopping window whereby a part of said shopping window may be used as a touch screen.

The radiation reflecting/scattering/emitting element may in some embodiments itself actively emit the radiation (such as from an emitter positioned thereon or therein). Otherwise, radiation may be emitted into the transmissive element. This radiation is then scattered/reflected at the first surface by the object, whereafter the function of the detection of the position is the same. Furthermore, the radiation reflecting/scattering element may take the form of a finger, a pen, a stylus or the like.

The radiation transmissive element may be a solid radiation transmissive element made from a material such as glass or plastic or any material suitable for use in fiber optics. Naturally, the transmissive element may have any form or shape, such as plane or bent.

The first and the second surface may be parallel or essentially parallel. Furthermore, the first and/or the second surface may have a narrow critical TIR-angle. The critical TIR-angle being defined as, an angle relative to the normal of a surface, wherein total internal reflection begins to take place. Said narrow critical TIR-angle may be obtained by application of a coating.

In the context of the present invention radiation subject to TIR in the transmissive element is said to propagate in a plane parallel with the first and/or second surface, despite the fact that it naturally will propagate in directions transverse to said plane as it is reflected between the two surfaces.

The radiation path comprises a first part and a second part. The first part extends from a point of touch on the first surface i.e. where the object touches the first surface, through a plane parallel with the first and/or the second surface and to the modulating means. The second part extends from the modulating means to the at least one-dimensional detecting surface.

The detecting means may be at least substantially parallel with the first and/or the second surface and may be provided at a distance from the first and/or second surface. In embodiments wherein detecting means are provided on both the first and second surface, a first detecting surface is provided on the first surface and a second detecting surface is provided on the second surface. In the latter embodiments the first detecting surface may be adapted to determine one characteristic of the reflected/scattered/emitted radiation and the second detecting surface may be adapted to detect a second characteristic.

When a first and a second detecting surface are provided, a first and a second modulating means may also be provided. Accordingly, radiation will propagate along a two second parts of the radiation path i.e. one propagating from the first modulating means to the first detecting surface and one propagating from the second modulating means and to the second detecting surface.

The at least one-dimensional detecting surface may comprise a plurality of sensing elements each being adapted to detect radiation and (due to the modulation means) to output a signal corresponding at least to an angle of incidence of the radiation. In some embodiments the signal additionally corresponds to a distance to the reflecting/scattering/emitting element.

The modulating means may comprise a single pinhole, an aperture, a lens, a slot etc, which may be used to determine an angle of the radiation incident on the detector. In such an embodiment a plurality of radiation detecting means with corresponding modulating means may be provided at different positions of the radiation transmissive element. Accordingly, a plurality of angles to the reflecting/scattering/emitting object may be used to determine the position of said object by means of triangulation.

In another embodiment a plurality of pinholes, apertures, lenses, slots etc., may be provided in an optical path of at least one of the detecting means. Thus, both an angle of incident radiation and a distance to the reflecting/scattering object may be determined, i.e. a representation of the position in polar coordinates.

Each of the sensing elements may be adapted to provide a separate radiation measurement. Furthermore, at least a part of the sensing elements may be positioned at least generally in the one direction or dimension, normally along a row or line. Two-dimensional radiation detecting means will normally have a matrix of sensing elements, a number of which will constitute a one-dimensional radiation detecting means. In one embodiment a first part of the sensing elements are used for the present invention, while another part is used for other purposes, such as for a web cam or the like.

As the radiation providing means and/or the radiation detecting means may be adapted to couple radiation into a transmissive element through the first and/or the second surface, the system may be integrated into any transparent material which is adapted to transport radiation by TIR. Accordingly, in one embodiment the system is integrated into a window, such as a part of the shopping window. Accordingly, the system may be used as an interactive interface wherein the user may request information such as about products displayed behind the shopping window.

At least a part of a TFT-screen may be used as radiation detecting means, such as a rim part of the TFT-screen. In one embodiment there is provided a plurality of radiation detecting means on a TFT-screen e.g. at the rim part, and each of said means is adapted to detect radiation at a predetermined range of angles and within a predetermined field of view. Accordingly, it is possible to detect multiple points of touch in the latter embodiment.

The modulating means may be formed by a plurality of per se independent or individual means for modulating radiation (lenses, absorbers, pin holes, apertures, wedges, scattering elements, mirrors or a combination thereof), as long as they are positioned so as to provide a modulation, comprising one or more intensity peaks, of the radiation on the row.

When an extension of the detecting means along the one dimension is smaller than the intensity pattern output or generated by the modulating means, only part of the intensity distribution or pattern will be incident on the detecting means and thereby detected. In that situation, the controlling means may be able to determine the position of the emitter on the basis of e.g. knowledge of the intensity pattern generated by the transforming element and on the relative positions between the detecting means and the transforming element. Thus, preferably, the controlling means comprises means for storing information relating to the transforming element, which information is used in the determination of the position.

It is clear that due to there normally being a predetermined distance (and relative positioning) between the radiation detecting means and the modulating means, a larger part of the intensity pattern will be incident on the detecting means, the farther the reflecting/scattering/emitting element is from the intensity pattern. This may be used, e.g. where the controlling means are adapted to determine a first value related to a distance, on the detecting means, between at least two predetermined parts of the intensity pattern and for determining the position of the reflecting/scattering/emitting element on the basis of the first value.

The system of the present invention may comprise a plurality of radiation providing means. Said means may be provided in a predetermined geometrical pattern along edges of the transmissive element. In one embodiment there is provided at least one radiation providing means on or at each edge of the transmissive element, such as two, three or four radiation providing means on or at each edge of the transmissive element.

In another embodiment the radiation providing means are provided such that any point on the first surface can be exposed to radiation from at least one of the radiation providing means.

An air gap may be provided between the radiation transmissive element and at least one of the radiation providing means. Accordingly, radiation with a large angle relative to the normal of the edge, will not be transmitted into the transmissive element as it will be reflected by the edge of the element. A further advantage of an air gap is that background radiation i.e. radiation not emitted from the radiation providing means, will not be transmitted into the radiation transmissive element, if its angle with the normal of the edge is large. Accordingly, noise from background radiation may be reduced.

In one embodiment the detecting surface is at least substantially parallel with the first and/or the second surface. In another embodiment the detecting surface defines a plane transverse to the first and/or the second surface.

Furthermore an air cavity may be provided between the modulating means and the radiation transmissive element.

In one embodiment the modulating means is provided on or at the same surface as the radiation detecting means. As an example the modulating means and the radiation detecting means may both be provided on the second surface i.e. the surface opposite the surface adapted to the be touched by the reflecting/scattering/emitting element. In order to make the detected signal angle sensitive, the radiation detecting means may be provided at a distance from the modulating means.

In another embodiment the modulating means is provided on or at the opposite surface as the radiation detecting means. As an example the modulating means may be provided on the second surface while the radiation detecting means is provided on the first surface. Due to the distance between the first and the second surface, radiation reflected by the modulation means which is also incident on the detecting means will be angle sensitive.

Moreover, the modulation means may be provided on the opposite surface such as the first surface, and the first area(s) may be adapted to reflect radiation towards the detecting surface of the detecting means; and the second area(s) may comprise at least one of: an absorbent area preventing radiation from propagating towards the detecting surface, and a radiation transmissive means allowing radiation to be coupled out of the transmissive element and into the transmissive means, the transmissive means comprising means for preventing said radiation from propagating back through said opposite surface i.e. the surface of the transmissive element which is opposite the radiation detecting means. When the modulating means is provided on the first surface the radiation transmissive area may be a pinhole, an aperture, a slot or a lens allowing the radiation to propagate out of the transmissive element e.g. into another element.

As mentioned above, the modulation means may be provided on the same surface and the first area(s) may be adapted to reflect radiation in a direction opposite the detecting surface so as to prevent said radiation from propagating towards the detecting means; and the second area(s) may comprise at least one of: an absorbent area preventing radiation from propagating towards the detecting surface, and a radiation transmissive means allowing radiation to be coupled out of the transmissive element and into the transmissive means so as to propagate towards the detecting surface. The radiation transmissive means may be an element abutting the radiation transmissive element having the first and the second surface.

It will be appreciated that the abovementioned areas adapted to reflect radiation in a direction opposite to a direction toward the detecting means will also achieve the desired function (i.e. making sure that radiation is not incident on the detecting means), if the radiation is reflected in other directions provided that the radiation is not incident on the radiation detecting means. As an example the radiation may be reflected in a direction parallel with one of the first and the second surface.

In one embodiment the one or more first and the one or more second of the areas of the modulation means are provided in a predetermined pattern, such as a pattern adapted to provide a spatial modulation.

The length of the modulation means in a plane substantially parallel with the first and/or the second surface may be at least twice the distance between the first and second surfaces at the area of the modulation means, such as at least three times, such as at least five times, or such as at least ten times.

The detecting surface may form an outer surface of a double- or triple-glazed window. Accordingly, the system may be integrated with a window, such as shopping window.

DETAILED DESCRIPTION OF THE DRAWINGS

Figure 2:
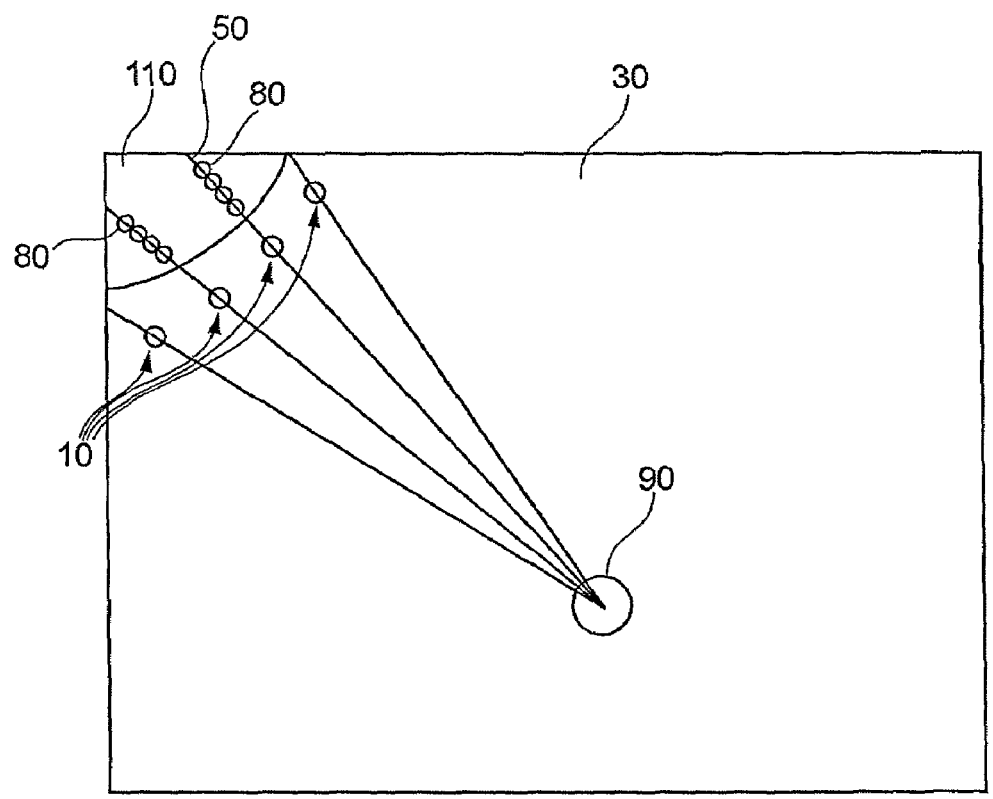

In the following the drawings is described in detail in which:

FIG. 1 discloses a cross-sectional elevation view an embodiment according to the invention, FIG. 2 discloses a plan view of the embodiment according to the invention, and FIGS. 3a-5 discloses different embodiments of the invention comprising means for redirecting radiation.

FIG. 1 discloses a radiation detecting means 110 in the form of a 2D-sensor, attached to a radiation transmissive element 30. In the figure there is provided one radiation detecting means, but in other embodiments there may be provided a plurality of radiation detecting means. The radiation detecting means may in some embodiments form an integral part of a LCD/TFT screen while the detecting means in other embodiments is a separate element.

On a first surface 2 (the upper surface in the embodiment of FIG. 1) of the radiation transmissive element a modulating means 20, 21 is provided. The modulating means comprises a plurality of areas, one or more first of the areas allowing or facilitating reflection of radiation travelling in the element back into the element, and one or more second of the areas preventing reflection of radiation travelling in the element back into the element.

On the second surface 4 (the lower surface in the embodiment of FIG. 2) a radiation absorptive/diffusive layer 70 is provided. Adjacent to or in an area of the absorptive/diffusive layer 70 there is provided an aperture 10 allowing radiation to be reflected back into the element 30.

The modulating means 20/21 may be provided as a wavelength specific mirror adapted to absorb radiation with a wavelength within a specific range while being transmissive for all other wavelengths. The absorptive range may be chosen to coincide with an emitting range of the radiation providing means. An advantage of the latter is that the narrowband wavelength specific mirror will reduce the direct influx of radiation from the radiation providing means.

The wavelength specific mirror may be a multilayer mirror such as a quarter-wave layer provided on an area of the radiation transmissive element such as above the radiation detecting means 110.

The radiation providing means may be integrated into an object adapted to emit radiation and to be used as a pointing device. Another manner may be one wherein radiation is transmitted toward the pointing device above the surface of the element, where the pointing device will then reflect or scatter the radiation onto and though the surface of the element, which then will guide the radiation toward the detector. Alternatively, or as a supplement, there may be provided separate radiation providing means on or at a surface of the transmissive element, whereby the radiation toward the object is guided inside the element and will be scattered/reflected at the surface thereof when engaged by the object. The modulating means may be adapted to modulate radiation incident on the radiation detecting means.

The radiation absorptive/diffusive layer 70 provided on the second surface may comprise one or more planar, non absorbent apertures. Said apertures may have different geometries, such as circular, elliptic, rectangular, triangular, lines, stars, irregular holes etc.

Radiation from the reflecting/scattering/emitting object 90 which is incident on the aperture 10 is reflected towards the narrowband mirror 20/21, which reflects the radiation such that it is incident on the radiation detecting means 110. On the radiation detecting means there will be depicted numerous over-laced images 50 of the reflecting/scattering/emitting object 90 which are all identical mirrored images. These over-laced images are formed due to it being possible to travel from the detector to the object at a number of different reflection angles between the radiation and the surfaces 2 and 4, as is illustrated on FIG. 1.

Each of the images on the radiation detecting means 110 represents an angle of incidence of radiation propagating from the reflecting/scattering/emitting object 90 and reflected by the aperture 10.

The absorptive/diffusive layer 70 results in an even rise in optical background noise reaching the radiation providing means 110. Alternatively, a retroflective layer may reflect the incident light back into the transmissive element, whereby less stray light reaches the radiation detecting means 110. Sand/glass-blasting or etching a surface and/or protecting the surface with a protective layer or foil, will provide a surface with blank figures that will further increase radiation trapped by total internal reflection.

Above the radiation detecting means 110, a filter 130 may be provided that can be either an absorption filter or an interference filter, such as a Fabry-Perot filter, and which is to filter radiation at wavelengths which do not correspond to the wavelength emitted by the radiation providing means 110 and thus are not reflected by the reflecting/scattering/emitting object 90. The filter may form an integral part of a spacer 170 which may be provided between the detecting means 110 and the second surface.

In order to ensure that radiation cannot propagate directly and un-reflected from the reflecting/scattering/emitting object 90 to the radiation detecting means 110, there may be provided an optical shield 120. In FIG. 1 the optical shield 120 extends from the second surface 4 into the radiation transmissive element 30. Alternatively or as a supplement, the radiation detecting means 110 may be provided at a distance below the second surface, e.g. by means of a spacer 170, as shown in FIG. 1.

Lowering the radiation detecting means 110 to avoid direct incident radiation has the disadvantage that the radiation detecting means 110 cannot form an integral part of a TFT screen unless this TFT screen is contoured to give room for the spacer 170.

It will be appreciated that the dimensions of the optical elements i.e.
the thickness of the radiation transmissive element 30,
the thickness of the spacer 170, and
the geometry of the radiation detecting means 110, the aperture(s) 10, the filter 130, the radiation absorptive/diffussive layer 70 and modulating means 20/21
are all inter-dependant.

A change in the thickness of the radiation transmissive element 30 may require that the dimensions of the other elements are changed correspondingly.

The distance from a point of touch of the reflecting/scattering/emitting object 90 to the detecting means depends on the total area of the first surface 2. With increased distance, the number of mirrored reflections increases and thus it is harder to differentiate each over-laced image 50 from the neighbouring image. Accordingly, the resolution of the detecting means must be higher in a system adapted to determine position of the reflecting/scattering/-emitting object 90 based on a measuring of distances between over-laced images.

The distance between images 50 on the radiation detecting means 110 corresponds to the distance from the mirror to the reflecting/scattering/emitting object 90.

The distance between adjacent/neighboring images will be the same and the number of images will correspond to the number of times that the image can be reflected which is limited by both an absolute number and by the refractive index of the reflecting/scattering/emitting object 90 which put a limit to the angles of light send into the transmissive element.

The width of the images corrected for the enlargement of images created by many reflections corresponds to the tangential width of the reflecting/scattering/emitting object 90. When an image of the object 90 is reflected multiple times under a low reflection angle, this image naturally has traveled a longer distance, which reduces the intensity thereof. In addition, the many reflections tend to narrow the image in the direction perpendicular to the reflecting surfaces. Thus, as the number of images correspond to the number of reflections which are visible for radiation detecting means 110, it is advantageous to average the width, whereby a higher accuracy is achievable than if only one image had been used.

The angles at which radiation is reflected/scattered into the transmissive element are determined by the refractive index of the object touching the first surface. Accordingly, some objects provide distinct radiation patterns. As an example, objects such as a finger, the surface of which comprises a plurality of different refractive indexes may be distinctive from other objects such as a pen having a uniform refractive index.

Furthermore, any depiction of a touching object will be determined by the shape of the aperture. A narrow and elongated rectangular aperture results in a depicted image (possibly more over-laced images) which analogously is narrow and elongated.

The distance from the aperture 10 to the image on the radiation detecting means 110 determines the enlargement of the image, the resolution as well as how easily the images may be separated. The images the farthest away from the aperture 10 are less radiation intensive as the energy of the radiation is spread over a larger area of the radiation detecting means 110. Images far away are also weaker over the radiation detecting means 110.

Furthermore, it will be appreciated that in order to obtain angle and depth information for any point of touch there may be provided a plurality of apertures as illustrated in FIG. 2.

The images stemming from multiple apertures 10 may be used to triangulate a point of touch as each row of images points directly to said point. When the average centrelines through the centre points of multiple reflections from one aperture 10 are established, the centrelines can be analysed using Fast Fourier Transformation (or other similar processing algorithms) to determine the pitch. The pitch between the images will, due to the enlargement, correspond to the distance to the point of touch. As the apertures 10 are not aligned on a line there is a need for an algorithm that normalizes the apertures 10 as an aligned row of apertures 10.

It will be appreciated that the larger the transmissive element is, the larger is the potential number of mirrored reflections. This increases the risk of over-laced neighbouring images. A solution to this problem is to provide a radiation detecting means with a higher resolution. However, there may still be a situation wherein an increased resolution is not enough. In such cases the controlling means may be adapted to determine the position based on angular information from one or more of the radiation detecting means 110. Such angular information may be based on centrelines extending through the images on radiation detecting means 110, via the corresponding aperture and to the point of touch. Such centrelines are indicated in FIG. 2.

In cases wherein the reflecting/scattering/emitting object 90 is positioned on a line extending from one radiation detecting means 110 to another radiation detecting means 110, the position cannot be determined using triangulation. Accordingly, it is advantageous that there is provided at least three radiation detecting means 110, such as even four or more detecting means 110.

In order to avoid flooding the radiation detecting means 110, the radiation detecting means may be operated with one or more predetermined radiation providing means. Furthermore, radiation providing means with directional output may be operated to track a reflecting/scattering/emitting object 90.

In some embodiments there may be provided one or more means for redirecting light propagating in the transmissive element in different directions depending on the incident direction and up and bounce angle. These means could be lenses 14, micro prisms 11 or gratings 12:

FIG. 3a-c discloses a radiation transmissive element 30 having a first surface 2. A reflecting/scattering/emitting element 90 touches the first surface 2, whereby radiation propagate inside the transmissive element 30 as it is subject to total internal reflection inside the transmissive element 30. A modulating means 21 is provided on the first surface 2.

In FIG. 3a a micro prism 11 provided on the first surface 2, redirect the total internally reflected radiation towards the radiation detecting means 110 which is provided on a second surface 4 of the transmissive element 30.

In FIG. 3b lenses 14 provided on the second surface 4, redirect the total internally reflected radiation towards the radiation detecting means 110 which is provided on a second surface 4 of the transmissive element 30.

In FIG. 3c gratings 12 provided on the second surface 4, redirect the total internally reflected radiation towards the radiation detecting means 110 as is described in further detail below.

FIG. 4 discloses a triple-glazed window comprising three separate window glasses 180 separated by air pockets 15. A patch 100 is provided on the first surface 2. The patch 100 comprises a grating 12 and an air pocket 13. Two lenses 160 and a radiation detecting means 110 are provided below the second surface 4.

The means for redirecting the light may be printed on the transmissive element 30, developed as a holographic structure in the transmissive element 30, hot embossed into the transmissive element 30 or glued on to the transmissive element 30 as one or more patch(es) 100 that is either printed, hot embossed, injection moulded, pressure moulded or developed with a holographic structure.

It will be appreciated that the higher the difference in refractive index between grating 12 and an adjacent material is the more efficient the gratings 12 are relative to their size. Air to polymer or air to glass provide the highest refractive index difference and can be achieved by providing air pockets 13. The air pockets 13 also protect the gratings 12 against contamination. FIG. 3c discloses air pockets 13 used in connection with gratings 12.

As an alternative to air pockets, a low refractive material may be used. This will however, reduce the efficiency of the preferred refractive index difference.

One advantage of gratings 12 is that they are essentially monochromatic and angle dependent. Accordingly, only light in the preferred wavelength will pass through the gratings and be directed toward the detector. The focussing property improves the overall photon budget and makes position detection more accurate, as the contrast is increased. The angle dependent property of gratings 12 makes it possible to provide a design comprising a plurality of gratings 12 each of which covers a narrow angle of incidence, whereby each grating 12 only focuses light to specific pixels, if the up and down bounce and the x,y direction is within defined angles.

As the refractive index between the first surface and an object depends on the position and the character of the object, gratings may be used to focus different objects. Gratings focusing wide angles may be used to focus artificial objects such as a pen point, having a high refractive index. Gratings focusing mid range angles may be used to focus objects such as fingers. Gratings focusing low range angles may be used to focus hovering objects that are trapped by surface imperfections, such as grease, water, bodily liquids of any sort, dust, indents, cracks, antiglare etch, micro structures, surface irregularities, surface contaminations etc.

The means for redirecting radiation are shielded from external radiation due to the absorbing/mirroring layers 21, which may be colour selective. In this manner, the present element 30 may be positioned between a user and a display/monitor and thereby provide a touch screen. The colour selective layers therefore enable the present system to selectively react to the particular wavelength(s) independently of the images provided through the element 30. Reflected/scattered radiation is redirected by the means for redirecting radiation towards the lens 160. The lens 160 focuses the reflected/scattered radiation to form a pattern on a radiation detecting means 110, which pattern corresponds to x,y,z incident angles from the reflecting/scattering object. The pattern will be unique and is determined by the size of the reflecting/scattering object, the refractive index of the object, and the distance between the object and the radiation detecting means. Accordingly, the point of touch may be determined/calculated using the above parameters.

Each of the elements in the system, (i.e. the touching object, the radiation transmissive element, the means for redirection radiation, the lenses and the sensor) can mathematically be defined by transfer functions and thus be translated into a mathematical model representing the system.

Touching objects have characteristics such as contact area, reflective properties including polarisation, position and refractive indices.

The waveguide has characteristics such as thickness, curvature, absorption, colour selective absorption, polarization, refractive indices in laminate and on surfaces.

The means for redirecting radiation (such as three-dimensional optical elements) have characteristics such as topology, colour selectiveness, absorption, polarisation and reflective properties. The characteristics may be obtained in the refractive (classical) or/and diffractive regime of light propagation in geometrical structured materials of different refractive indices.

The focusing system has characteristics such as focal depth, lens size, optical axis, distortion correction elements, alignment relatively to three-dimensional optical elements and sensor.

The sensor has properties such as area, pixels, colour specific sensitivity, polarisation, dynamic range, linearity, integration time, shutter, pixel binning, etc.

All of these definitions may be represented by transfer functions in greater or smaller detail or a limited chosen number of these characteristics may be represented by transfer functions depending on the different sorts of touch detection probabilities and the quality of same that are desired.

A large number of standard methods are adoptable to analyse the signals to derive precise position detection and other key characteristics of the touching object. The design of the system can be such that one, two, three or more up and down bounce angles can be analysed separately simply by the controlling the topology of the three-dimensional optical elements. E.g. all facets of the three-dimensional optical element are designed to redirect radiation in one x,y,z angle and very small changes causes the radiation to be redirected outside the sensor. This sensitivity creates high resolution and the high possible number of redundant information associated with the large possible number of facets creates the basis for a high resolution system.

Every contact area and any object with any refractive index in any position on the waveguide will produce an unique representation on the sensor, provided it receives sufficient radiation to provide enough photons to be detected by the sensor and provided that the mathematical transfer function of the three-dimensional optical elements has one-to-one mapping properties. A look-up table with interpolation methods can discern the information accurately and the system can adaptively reduce or increase the amount of information required to process a position detection. This is done by importing more or less information from the sensor using a strategy where the previous frame is used to select the pixels receiving key information that can be converted into position detection. Alternatively, the representation can be transformed into a pattern which allows FFT analysis, peak fit procedures etc.)

The system may be adapted to be used in connection with any optically transparent material such as window glass. This may be done by changing the relative position of the lens 160 and the means for redirecting light.

As an example, the system may be provided on a double- or triple-glazed window comprising two or three window glasses 180, respectively. Accordingly, the position of the reflecting/scattering/emitting object 90 must be determined on the outer surface of the outer window glass.

In order to illuminate the reflecting/scattering/emitting object 90, a similar system may be utilised however optimised for light propagation in the reverse direction. Accordingly, there may be provided two versions of the system: one for detecting purposes and one for illumination purposes. It will be appreciated that the system used for illumination purposes must be optimised to enhance the photon budget, whereas when the system used for detecting purposes must be designed to optimise the position information content.

As an alternative to the above-mentioned illumination of the window glass, radiation may be emitted into the glass from the edge using direct optical coupling of radiation providing means comprising built in gratings 12 controlling output angles or by slanting the edges of the window glass or providing slanted prisms on or at the edge of the window glass.

In the context of the present invention the term window glass 180 is used for any transparent material usable to fit in a window and in which total internal reflection may take place in a direction transverse to the depth of the window. Accordingly, the window glass may be plane or curved having two opposed surfaces the distance between which total internal reflection may occur. In some embodiments, the distance between the two surfaces may be essentially constant along at any point of the window glass which is used for pointing purposes.

In the embodiment disclosed in FIG. 5 no focusing lens 160 is provided between the radiation detecting means 110 and the means (12, 13) for redirecting radiation. Accordingly, radiation propagating inside the transmissive element 30 is redirected by the redirecting means directly to the sensor 110, where the specific patter will be representative for a specific position of a touching object 90 at the waveguide 30.

The light propagating inside the touch pad waveguide 30 is redirected by the three-dimensional optical elements toward the radiation detecting means 110 where the light is received in a pattern that can be analysed according to x,y,z directional information.

A number of improvements or optimizations may be performed:

In one embodiment, the transmissive element comprises a plurality of laminated layers. This is advantageous as the refractive index between two layers may be used actively.

As an example a shift from high refractive index to progressively lower refractive indices will introduce a number of TIR mirrors where high-angle radiation will be unable to penetrate whereas low-angle radiation moves straight through. A polymer surface with a refractive index at 1.5 and air with a refractive index at 1 provides a critical angle of 41.81° from polymer to air.

A polymer surface with a refractive index of 1,5 and a middle polymer with a refractive index of 1.4 creates, from high polymer to lower refractive index polymer, a critical angle at 68.96°.

Even though the gratings 12 are strictly speaking a three dimensional design there are no problems associated with laminating the design together such that the cavities are confined inside the laminate. Such a laminate may be produced using standard high volume production methods such as the methods employed to produce holograms.

This offers the opportunity of confining gratings 12 in small air cavities 13 and to attach them separately to a specific radiation transmissive element, such as a radiation transmissive element having a specific TIR mirror adapted to increase the optical amplification of modulated radiation which is trapped by total internal reflection in the high refractive layers.

This in turn increases the system sensitivity, as modulation in high refractive indices is scarce relative to the lower refractive indices. In a system which is inadequate in differentiating between low and high refractive indices, surface contamination is a problem, as such contamination is created optical background noise and thus reduces the dynamic range. This, however, may be overcome by filtering algorithms incorporated in the controlling means.

When a grating is confined in a cavity, the signal to noise ratio must be increased e.g. by discarding radiation using optical filters. The large up and down angle dependent laminate design reduces optical noise, as any contamination on a surface, e.g. the first surface, will only introduce noise into the transmissive element, if it had a high refractive index. Oil, grease and water have refractive indexes around 1.35 and will therefore only transmit radiation into the transmissive element at angles below 64.16, such radiation will pass straight through a 1.5/1.4 refractive TIR mirror.

Accordingly, radiation initiated by surface stains will pass though the laminated transmissive element and be absorbed or scattered by possible layers below the transmissive element. Thereafter it may re-enter the transmissive element at angles that cannot be trapped and exit the transmissive element through the opposite surface.

Discrimination of radiation propagating in undesired angles in the transmissive element may be achieved by:
1. Inserting air gaps around specific layers in a multimode transmissive element to create TIR mirrors consisting of polymer to air refractive difference.
2. Painting absorbent paint layers with a low refractive index on surfaces of the transmissive element to cut of the possible lower angles of incidence by means of an inverse TIR mirror effect, where the low-angle signals are absorbed because they alone can pass through a TIR mirror and become absorbed by the absorbent layers.

IR or polarisation filters can contribute to improve the contrast achieved through the optical noise suppression. However, in a transmissive element with optimised photon budget and radiation detecting means with fast integration time, the active radiation providing means may create a signal to noise ratio that exceeds what is needed to obtain an accurate position detection.

Radiation used to illuminate the reflecting/scattering/emitting object could have an incident angle as close to the critical angle as possible, as this increases the amount of photons per square centimetre and illuminate reflecting/scattering/emitting object in a way that makes them perform less directional and more as Lambertian objects. By confining the radiation in a thin high refractive top layer, light may be concentrated when an object touched the first surface. More photons will therefore leave the transmissive element and get scattered by the touching object.

The first surface could be made of high refractive index material such as poly carbonate or high refractive index silicon rubber 1.6. The object 90 could be a pen point made of matching or higher refractive index polymers or silicon that is reflective rather than translucent. This will enable the pen point 90 to absorb from the surface and reflect it back in angles that are essentially parallel to the surface. Fingers and hands cannot reflect light at such angles due to the fact that fingers and hands form an angle-dependent TIR mirror that deflects light at angles above 69.63 degrees. This will ensure that relatively little light from fingers and hands be confined in the high refractive top layer that, thus, will work as a touch pad waveguide 30 for pen points 90.

The invention claimed is:

1. A system for determining a position of an object adapted to reflect/scatter/emit radiation, the system comprising:
   a radiation transmissive element having a first surface being adapted to be engaged by the object so as to reflect/scatter/emit radiation into the element, and a second surface opposite to the first surface, the radiation transmissive element being adapted to guide reflected/scattered/emitted radiation therein by total internal reflection along a first part of a radiation path extending from the object towards a radiation detector;
   said radiation detector having an at least one-dimensional detecting surface and being adapted to detect radiation through the first and/or the second surface, which radiation is reflected/scattered/emitted by the object, and to output a signal relating to the detected radiation; and
   at least one radiation modulator being provided in the first part of the radiation path and adapted to prevent at least a part of the reflected/scattered/emitted radiation from propagating to the radiation detector, said at least one radiation modulator being positioned on or at the first and/or the second surface and defining, in the plane of the first and/or second surface, a plurality of areas,
      one or more first of the areas allowing or facilitating reflection of radiation travelling in the radiation transmissive element back into the radiation transmissive element, and
      one or more second of the areas preventing reflection of radiation travelling in the radiation transmissive element back into the radiation transmissive element.

2. A system according to claim 1, wherein the detecting surface is at least substantially parallel with the first and/or the second surface.

3. A system according to claim 1, wherein an air cavity is provided between the radiation modulator and the radiation transmissive element.

4. A system according to claim 1, wherein the radiation modulator is provided on or at the same surface of the radiation transmissive element as the radiation detector.

5. A system according to claim 1, wherein the radiation modulator is provided on or at an opposite surface of the radiation transmissive element with respect to the radiation detector.

6. A system according to claim 1, wherein the radiation modulator is provided on an opposite surface of the radiation transmissive element with respect to the radiation detector and wherein
   the first area(s) are adapted to reflect radiation towards the detecting surface of the detecting surface; and
   the second area(s) comprises at least one of:
      an absorbent area preventing radiation from propagating towards the detecting surface, and
      a radiation transmissive outcoupler allowing radiation to be coupled out of the radiation transmissive element and into the transmissive outcoupler, the transmissive outcoupler comprising means for preventing said radiation from propagating back through said opposite surface.

7. A system according to claim 1, wherein the radiation modulator and the radiation detector are provided on the same surface of the radiation transmissive element and wherein
   the first area(s) are adapted to reflect radiation in a direction opposite the detecting surface so as to prevent said radiation from propagating towards the radiation detector; and
   the second area(s) comprises at least one of:
      an absorbent area preventing radiation from propagating towards the detecting surface, and
      a radiation transmissive outcoupler allowing radiation to be coupled out of the transmissive element and into the transmissive outcoupler so as propagate towards the detecting surface.

8. A system according to claim 6 or 7, wherein the one or more first and the one or more second of the areas of the radiation modulator are provided in a predetermined pattern.

9. A system according to claim 1, wherein a length of the radiation modulator in a plane substantially parallel with the first and/or the second surface is at least twice the distance between the first and second surfaces at the area of the radiation modulator.

10. A system according to claim 1, wherein the detecting surface is provided on or at the second surface.

11. A system according to claim 1, wherein the detecting surface forms an outer surface of a double-or triple-glazed window.

* * * * *